Patented June 1, 1948

2,442,542

UNITED STATES PATENT OFFICE 2,442,542

PRODUCTION OF CHLOROACETONITRILE

Ingenuin Hechenbleikner, Stamford, Conn., assignor to American Cyanamid Company, New York, N. Y., a corporation of Maine No Drawing. Application October 4, 1943, Serial No. 504,903

1 Claim. (Cl. 260—464)

The present invention relates to a method of producing chloroacetonitrile, a chemical compound which is useful as a fumigant for the control of insects and which also serves as an intermediate in the preparation of polychloroacetonitriles.

The principal object of the invention is to produce the above compound in good yield and of high purity from a readily available raw material by a simple method and without isolating an explosive intermediate product, the latter being fraught with extreme danger.

The invention contemplates in one of its broadest aspects the treatment of the hydrochloride of aminoacetonitrile in an aqueous hydrochloric acid solution with sodium nitrite to yield diazoacetonitrile, and without isolating the latter immediately converting the same to chloroacetonitrile.

In carrying out the process, a reaction vessel provided with suitable means of cooling and agitation is charged with an aqueous solution of aminoacetonitrile, for example, 1 mol of nitrile per 100 cc. of water. The charge is stirred and kept cool during the entire reaction, for example, from 0° to 10° C., to avoid hydrolysis of the nitrile. Hydrochloric acid is added in quantity sufficient to form the hydrochloride of aminoacetonitrile and to convert the diazoacetonitrile to chloroacetonitrile. Aqueous sodium nitrite solution, for example, 1 mol of nitrite per 100 cc. of water, is then added slowly to the solution to cause the formation of diazoacetonitrile, the latter immediately reacting with the free hydrogen chloride to produce the chloroacetonitrile. Upon standing, the reaction mixture separates into two layers, an upper water layer and the chloroacetonitrile as the lower layer. The product, after separation and removal from the aqueous layer, may be purified by distillation under reduced pressure.

Example 304 g. of hydrochloric acid (37% solution) were added slowly with stirring to an aqueous solution consisting of 56 g. of aminoacetonitrile and 100 g. of water maintained at a temperature between 0° and 10° C. Agitation and cooling of the solution were continued while an aqueous solution consisting of 76 g. of sodium nitrite and 100 g. of water was added over a period of about two hours. The reaction mixture, after standing for ½ hour, separated into two layers. The upper layer was removed and extracted with carbon tetrachloride. The extract and the lower layer were combined, dried over calcium chloride and fractionated, 60 g. (80% yield) of chloroacetonitrile, a colorless mobile liquid, B. P. 66° C. at 100 mm., were obtained.

The method herein described is of particular utility in that it provides a marketable product of high purity.

While the invention has been described with particular reference to specific embodiments, it is to be understood that it is not to be limited thereto, but is to be construed broadly and restricted solely by the scope of the appended claim.

I claim:

A method of producing chloroacetonitrile which comprises treating an aqueous solution of aminoacetonitrile with hydrochloric acid, said acid being in excess of the quantity required to form the hydrochloride of aminoacetonitrile, maintaining the solution at a temperature not exceeding about 10° C., adding sodium nitrite to the solution and recovering the chloroacetonitrile therefrom.

INGENUIN HECHENBLEIKNER.

REFERENCES CITED

The following references are of record in the file of this patent:

Curtius, Ber. deut. Chem., vol. 27, page 61 (1894).
Curtius, Ber. deut. Chem., vol. 31, page 2491 (1895).
Jochem, Beilstein (4th ed.), vol. 4, page 337.
Staudinger et al., Chem. Abst., vol. 11, pages 595–597.
Taylor et al., Sidgwick's Org. Chem. of Nitrogen (1937), pages 349–352.